US011937362B2

(12) United States Patent
Kinugasa et al.

(10) Patent No.: US 11,937,362 B2
(45) Date of Patent: Mar. 19, 2024

(54) CHARGED PARTICLE ACCELERATION DEVICE AND METHOD FOR ADJUSTING CHARGED PARTICLE ACCELERATION DEVICE

(71) Applicants: TOSHIBA ENERGY SYSTEMS & SOLUTIONS CORPORATION, Kawasaki (JP); TOSHIBA PLANT SYSTEMS & SERVICES CORPORATION, Yokohama (JP)

(72) Inventors: Kunihiko Kinugasa, Yokohama (JP); Hiromasa Itou, Gyoda (JP); Takeshi Takeuchi, Kawasaki (JP); Yoshiharu Kanai, Yokohama (JP)

(73) Assignees: TOSHIBA ENERGY SYSTEMS & SOLUTIONS CORPORATION, Kawasaki (JP); TOSHIBA PLANT SYSTEMS & SERVICES CORPORATION, Yokohama (JP)

( * ) Notice: Subject to any disclaimer, the term of this patent is extended or adjusted under 35 U.S.C. 154(b) by 293 days.

(21) Appl. No.: 17/447,342

(22) Filed: Sep. 10, 2021

(65) Prior Publication Data

US 2021/0410267 A1 Dec. 30, 2021

Related U.S. Application Data

(63) Continuation of application No. PCT/JP2020/017066, filed on Apr. 20, 2020.

(30) Foreign Application Priority Data

Apr. 26, 2019 (JP) ................................ 2019-085396

(51) Int. Cl.
*H05H 7/04* (2006.01)

(52) U.S. Cl.
CPC ......... *H05H 7/04* (2013.01); *H05H 2007/048* (2013.01)

(58) Field of Classification Search
None
See application file for complete search history.

(56) References Cited

U.S. PATENT DOCUMENTS 5,388,086 A * 2/1995 Yamasaki .......... G11B 7/08582
5,467,769 A * 11/1995 Yoshino ............... G01R 33/383
324/318

(Continued)

FOREIGN PATENT DOCUMENTS

JP 04-230000 A 8/1992
JP 5-217694 A 8/1993

(Continued)

OTHER PUBLICATIONS

International Search Report dated Jul. 7, 2020 in PCT/JP2020/017066 filed on Apr. 20, 2020, 2 pages.

*Primary Examiner* — Thomas J. Hiltunen
(74) *Attorney, Agent, or Firm* — Oblon, McClelland, Maier & Neustadt, L.L.P.

(57) ABSTRACT

A charged particle acceleration device, which eliminates the need for repeating alignment adjustment even in the case of repeating installation of the controllers, is provided, and a method for adjusting the same is provided.
A charged particle acceleration device 10A includes: controllers 15,15*a*,15*b*,15*c* configured to control a beam trajectory 12 of charged particles that pass through a duct 11 to be inserted through the controllers 15; and a stage 20 that is supported by a frame 16 fixed to a base and reversibly moves the controllers 15 in a direction of intersecting the beam trajectory 12.

5 Claims, 5 Drawing Sheets

(56) References Cited

U.S. PATENT DOCUMENTS

| | | | | |
|---|---|---|---|---|
| 5,528,212 | A * | 6/1996 | Challenger | H01F 7/0278 335/298 |
| 7,239,095 | B2 * | 7/2007 | Ho | H05H 7/18 315/505 |
| 7,522,026 | B2 * | 4/2009 | Kitahara | H05H 7/04 335/299 |
| 8,222,617 | B2 * | 7/2012 | Iseki | A61N 5/1043 250/492.1 |
| 9,293,296 | B2 * | 3/2016 | Aoki | F16M 11/046 |
| 10,199,148 | B2 * | 2/2019 | Otani | H05H 13/04 |
| 2007/0273464 | A1 | 11/2007 | Kitahara et al. | |
| 2010/0002843 | A1 | 1/2010 | Liu et al. | |
| 2017/0236631 | A1 | 8/2017 | Otani et al. | |

FOREIGN PATENT DOCUMENTS

| | | | |
|---|---|---|---|
| JP | 11-21 4198 | A | 8/1999 |
| JP | H11214198 | A * | 8/1999 |
| JP | 2003-188000 | A | 7/2003 |
| JP | 2006-344466 | A | 12/2006 |
| JP | 2006-344466 | A5 | 12/2006 |
| JP | 2007-149405 | A | 6/2007 |
| JP | 2007-280969 | A | 10/2007 |
| KR | 2002-0076639 | A | 10/2002 |
| RU | 2 367 123 | C1 | 9/2009 |
| WO | WO 2016/084218 | A1 | 6/2016 |

* cited by examiner

CHARGED PARTICLE ACCELERATION DEVICE AND METHOD FOR ADJUSTING CHARGED PARTICLE ACCELERATION DEVICE

CROSS-REFERENCE TO RELATED APPLICATIONS

This application is a Continuation Application of No. PCT/JP2020/017066, filed on Apr. 20, 2020, and the PCT application is based upon and claims the benefit of priority from Japanese Patent Application No. 2019-085396, filed on Apr. 26, 2019, the entire contents of which are incorporated herein by reference.

TECHNICAL FIELD

Embodiments of the present invention relate to a charged particle acceleration device and a method for adjusting a charged particle acceleration device.

BACKGROUND

In an accelerator, in order to control a beam trajectory of charged particles, a plurality of devices such as a bending electromagnet, a quadrupole electromagnet, and a screen monitor are installed along the beam trajectory. These control devices are required to be installed with high accuracy with respect to the beam trajectory. Thus, when these control devices are installed, alignment adjustment is performed to position these control devices with reference to the fixed point of the building. However, the accelerator also includes devices that are installed only during the adjustment and removed during normal operation as exemplified by an emittance monitor to be used only for adjusting an injector.

PRIOR ART DOCUMENT

Patent Document

[Patent Document 1] JP 2007-149405 A

SUMMARY

Problems to be Solved by Invention

In construction of the accelerator as described above, a lot of time is spent because it is necessary to repeatedly perform precise alignment of the control devices every time the adjustment stage is switched to the normal state.

In view of the above-described circumstances, an object of embodiments of the present invention is to provide a charged particle acceleration device and a method for adjusting it, each of which eliminates the need for repeating alignment adjustment even in the case of repeating installation of the control devices.

BRIEF DESCRIPTION OF DRAWINGS

FIG. 5A is a top view at the time of installation, FIG. 5B shows the adjustment stage, and FIG. 5C shows the normal state.

DETAILED DESCRIPTION

First Embodiment

Figure 1A:
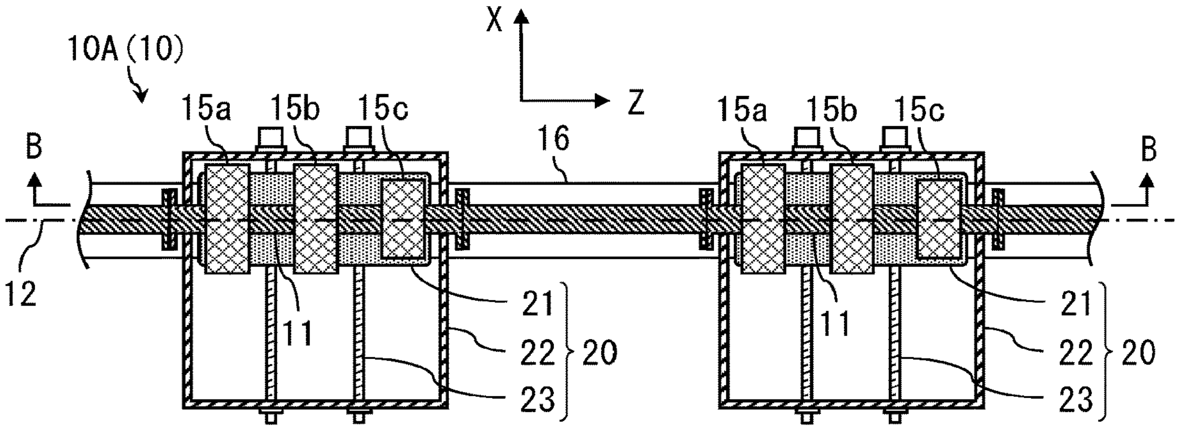
FIG. 1A is a top view of the charged particle acceleration device according to the first embodiment in a normal state.
Figure 1B:
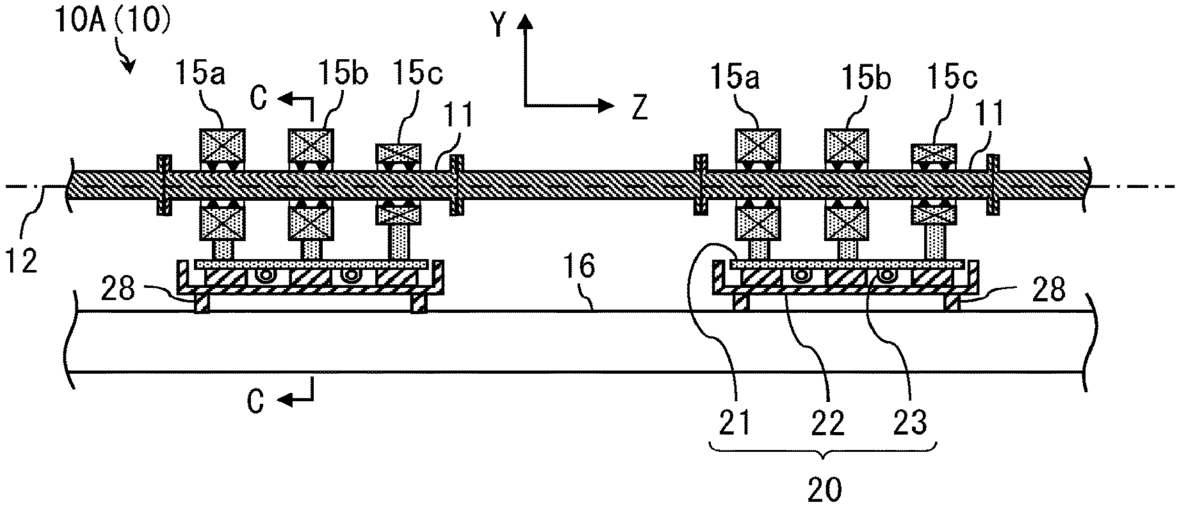
FIG. 1B is a partial cross-sectional view of it taken along the line B-B of FIG. 1A.
Figure 1C:
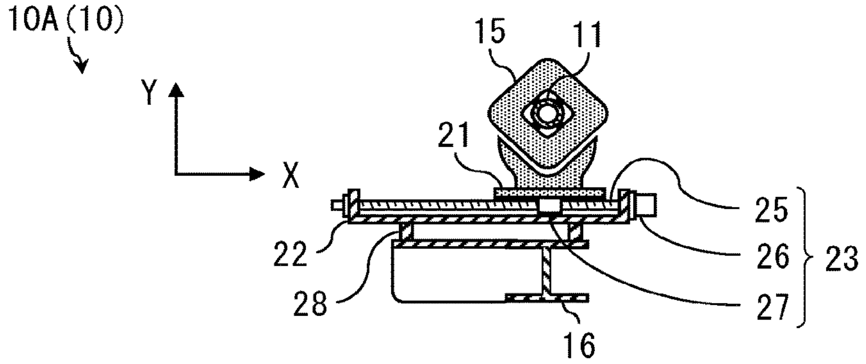
FIG. 1C is a partial cross-sectional view of it taken along the line C-C of FIG. 1C.

Hereinafter, embodiments of the present invention will be described by referring to the accompanying drawings. FIG. 1A is a top view of the charged particle acceleration device 10A according to the first embodiment in a normal state, FIG. 1B is a partial cross-sectional view of it taken along the line B-B of FIG. 1A, and FIG. 1C is a partial cross-sectional view of it taken along the line C-C of FIG. 1A.

The charged particle acceleration device 10A (10) includes: controllers 15 (15*a*, 15*b*, 15*c*) configured to control a beam trajectory 12 of charged particles, which pass through ducts 11, and also configured such that the ducts 11 are inserted through the controllers 15; and stages 20 that are supported by a frame 16 fixed to a base (not shown) and reversibly move the controllers 15 in a direction of intersecting the beam trajectory 12.

In the charged particle acceleration device 10A (10), the beam trajectory 12 is formed by interconnecting a plurality of ducts 11 at the joint portions at both ends thereof. In detail, the joint portions (flange plates) of the adjacent ducts 11 facing each other are made to abut and fastened with screws or the like such that the plurality of ducts 11 are connected, and consequently, the beam trajectory 12 of moving charged particles is formed.

The plurality of controllers 15 (15*a*, 15*b*, 15*c*) such as a bending electromagnet, a quadrupole electromagnet, and a screen monitor are installed along the beam trajectory 12, and the trajectory of the charged particles moving in the internal space of the ducts 11 is controlled. Note that the controllers 15 are not limited to them.

Although the charged particle acceleration device 10A (10) is heavy, the frame 16 is a structure configured to support the charged particle acceleration device 10A (10) along the beam trajectory 12 and is built on a concrete-cast base (not shown). Although the frame 16 in the figure is exemplified as an H-steel coordinated horizontally in the longitudinal direction, its aspect is not particularly limited to it. The frame 16 can also be coordinated vertically or diagonally depending on the installation position of the controllers 15.

Each stage 20 includes: a fixing plate 22 to be fixed to the frame 16; a moving plate 21 to which controllers 15 are fixed; and a linear-motion driver (linear-motion mechanism) 23, wherein the moving plate 21 moves relative to the fixing plate 22 and the linear motion driver 23 axially rotates so as to move the moving plate 21 with respect to the fixing plate 22.

The bottom face of the moving plate 21 abuts on the top face of the fixing plate 22 so as to slide. While being restricted from moving along the beam trajectory 12, the moving plate 21 can move in the direction intersecting the beam trajectory 12 with a stroke width with which the controllers 15 do not interfere with the beam trajectory 12. Although it is not illustrated, the moving plate 21 positioned on the top face of the fixing plate 22 can be fixed at that position by using fastening members so as not to move with respect to the fixing plate 22.

The controllers 15 (15*a*, 15*b*, 15*c*) such as a bending electromagnet, a quadrupole electromagnet, and a screen monitor are installed on the moving plate 21 together with the duct 11 so as to penetrate the center of the trajectory through which the charged particles pass. The moving plate 21 on which these controllers 15 are installed is positioned on the top face of the fixing plate 22 and fixed with fastening members. The assembly of these controllers 15, each duct 11, and each stage 20 is performed at a location different from the installation location of the charged particle acceleration device 10A (10), and after being integrally assembled, it is transported to the installation location.

At the installation location of the charged particle acceleration device 10A (10), each stage 20 in which the controllers 15 and the duct 11 are integrally assembled is connected to the upper portion of the frame 16 with the use of a height-adjustable coupling member 28. Although a widely used combination of screws and nuts can be used as the coupling member 28, any member capable of stably fixing a high-gravity object and adjusting its height can be appropriately used as the coupling member 28.

These controllers 15 are required to be installed with high accuracy with respect to the beam trajectory 12. Thus, when each stage 20 in which these controllers 15 are installed is installed on the frame 16, alignment adjustment for positioning is performed with reference to the fixed point of the building while adjusting the height of the coupling member 28.

As shown in FIG. 1C, the linear-motion driver 23 includes: a nut 27 to be fixed to the moving plate 21; a screw rod 25 that is screwed into the nut 27 and is rotatably supported at both ends by the fixing plate 22; and a rotation driver 26 that applies rotational torque to the screw rod 25.

Since the linear-motion driver 23 is configured as described above, the integrated structure of the duct 11 and the moving plate 21 can be evacuated to the side of the beam trajectory 12 from the position determined by the positioning and can be returned to the original position determined by the positioning with satisfactory reproducibility.

Although the storage space of the linear-motion driver 23 is provided in a groove shape on the top face of the fixing plate 22 in the drawing, the storage space may be a through hole in which the thick portion is perforated in parallel with the main face of the moving plate 21. The linear-motion driver 23 is not an essential component, and the integrated structure of the controllers 15, the duct 11 and the moving plate 21 may be moved by another method, for example, manually.

Figure 2A:
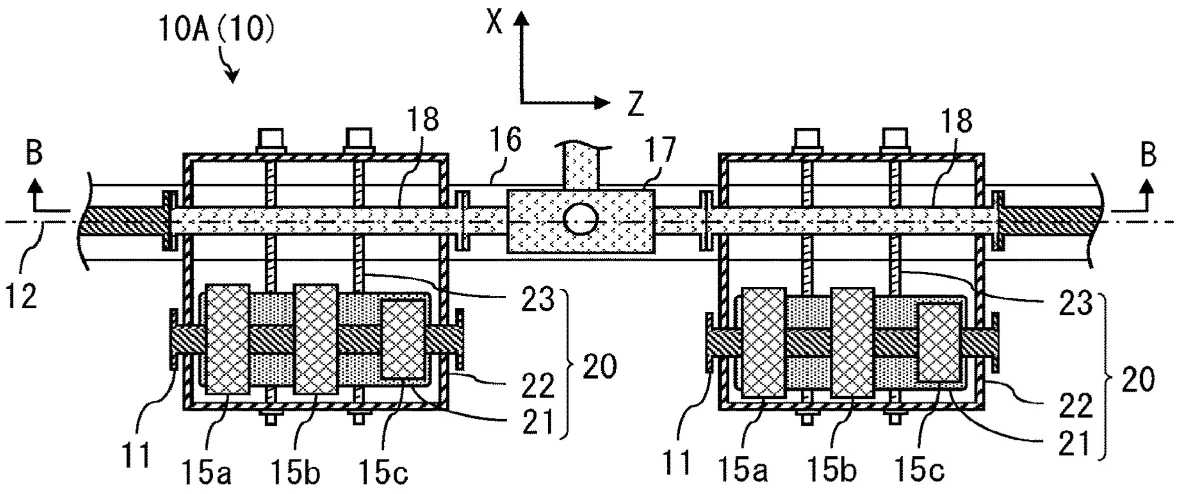
FIG. 2A is a top view of the charged particle acceleration device according to the first embodiment in the adjustment stage.
Figure 2B:
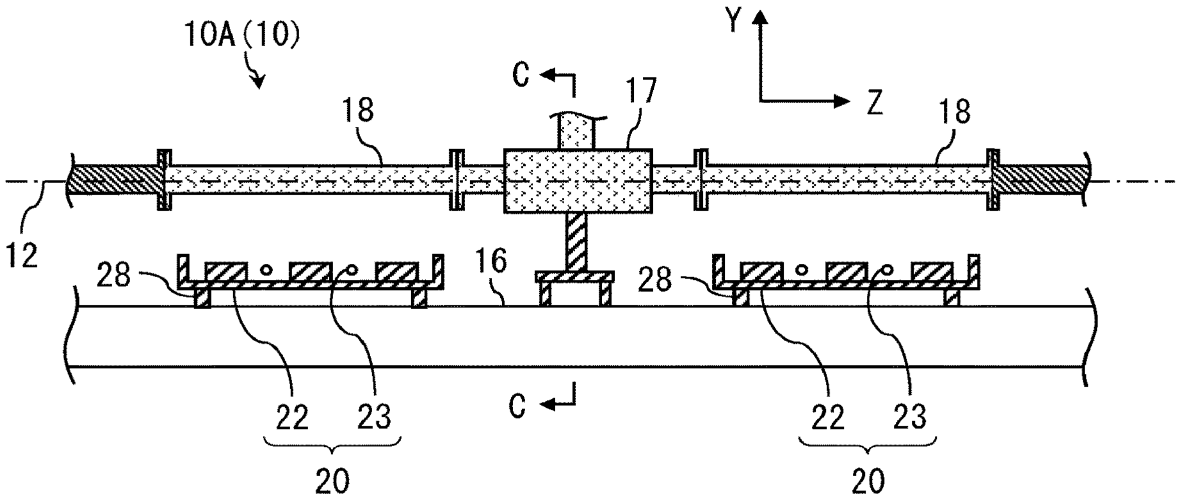
FIG. 2B is a partial cross-sectional view of it taken along the line B-B of FIG. 2A.
Figure 2C:
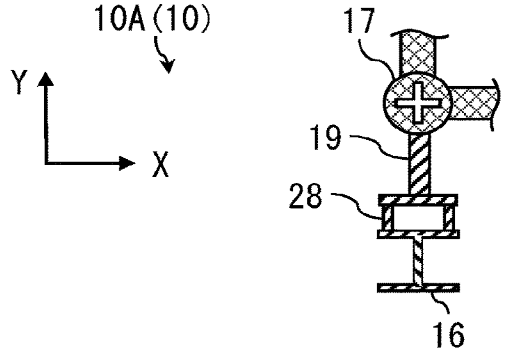
FIG. 2C is a partial cross-sectional view of it taken along the line C-C of FIG. 2B.

FIG. 2A is a top view of the charged particle acceleration device 10A according to the first embodiment in the adjustment stage, FIG. 2B is a partial cross-sectional view of it taken along the line B-B of FIG. 2A, and FIG. 2C is a partial cross-sectional view of it taken along the line C-C of FIG. 2B. In the adjustment stage of the charged particle acceleration device 10A (10), the moving plate 21 of each stage 20 is moved laterally or in the moving direction due to the linear-motion driver 23 to the extent that the controllers 15 do not interfere with the beam trajectory 12.

Thereafter, an adjuster 17 such as an emittance measurement device is disposed on the beam trajectory 12 after the controllers 15 are evacuated. This adjuster 17 is disposed on the beam trajectory 12 with adjustment ducts 18 at both ends. As shown in FIG. 2C, the adjuster 17 is installed on the frame 16 via a support member 19 and the coupling member 28 with highly accurate alignment adjustment for the beam trajectory 12.

When the adjustment stage of the charged particle acceleration device 10A (10) is completed, the adjuster 17 is removed from the frame 16 and the evacuated controllers 15 are returned to the beam trajectory 12. The controllers 15 return to the position of the original beam trajectory 12 with high reproducibility, and thus, realignment adjustment for the controllers 15 is unnecessary.

Second Embodiment

Figure 3:
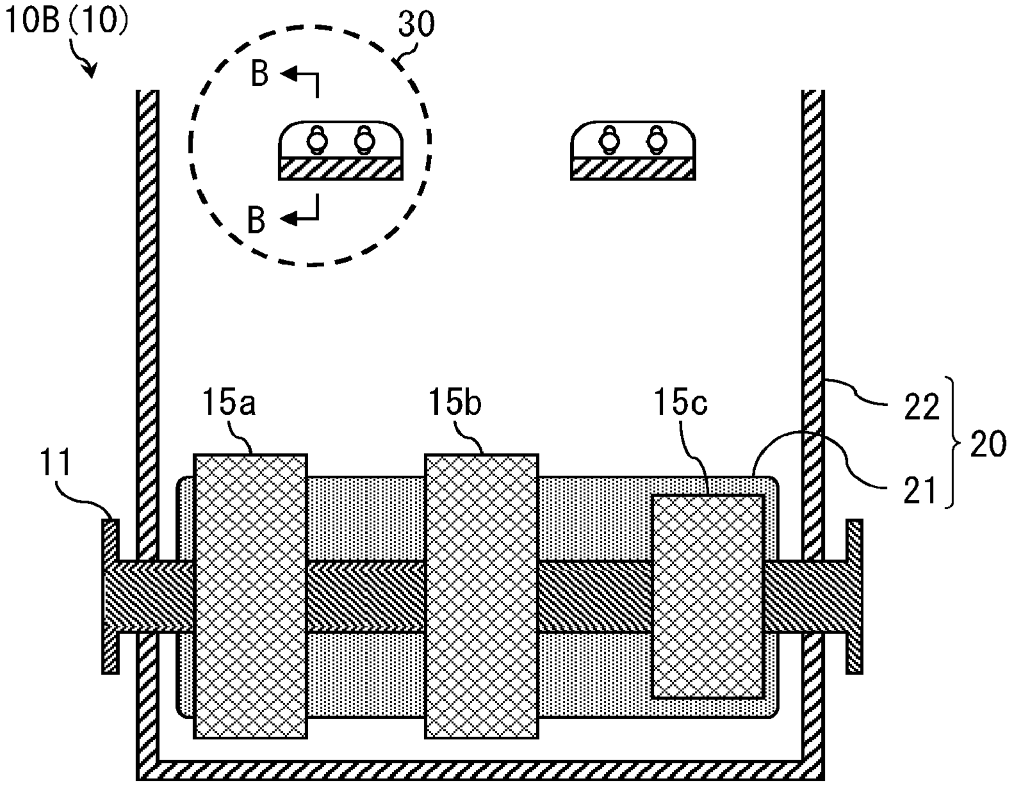
FIG. 3 is a partial top view of the charged particle acceleration device according to the second embodiment.
Figure 4:
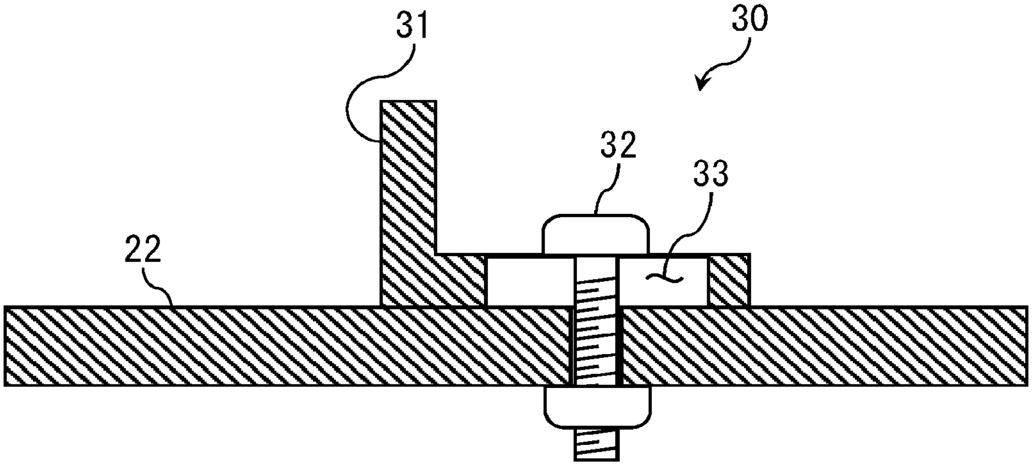
FIG. 4 is a cross-sectional view of a regulator of the charged particle acceleration device shown in FIG. 3, taken along the line B-B in FIG. 3.

Next, the second embodiment of the present invention will be described by referring to FIG. 3 and FIG. 4. FIG. 3 is a partial top view of the charged particle acceleration device 10B according to the second embodiment. FIG. 4 is a cross-sectional view of a regulator (regulatory member) 30 shown in FIG. 3, taken along the line B-B in FIG. 3. In FIG. 3 and FIG. 4, components having the same configuration or function as those in FIG. 1A to FIG. 1C or FIG. 2A to FIG. 2C are denoted by the same reference signs, and duplicate description is omitted.

In the charged particle acceleration device 10B of the second embodiment, the stage 20 has the regulator 30 that regulates the movement of the moving plate 21 with respect to the fixing plate 22. As shown in FIG. 4, the regulator 30 is composed of: an abutting portion 31 that abuts on a part of the moving plate 21; and a fastening member 32 that fixes the abutting portion 31 and the fixing plate 22. The abutting portion 31 is provided with an adjustment margin 33 for finely adjusting the position of the abutting surface with the moving plate 21. The adjustment margin 33 may be provided on the side of the fixing plate 22 instead of the side of the abutting portion 31. The position where the regulator 30 is provided may be on the edge side instead of the main face of the fixing plate 22 shown in the figure.

After attaching the controllers 15 and each stage 20 to the frame 16, until the alignment adjustment is completed, the regulator 30 is required to be fixed to the fixing plate 22 in the state where the abutting portion 31 is in contact with the moving plate 21. Since the regulator 30 is provided in this manner, at the time of returning the controllers 15 evacuated in the adjustment stage to the beam trajectory 12, the controllers 15 can be accurately returned to the original position by simply bringing the moving plate 21 into contact with the regulator 30.

Third Embodiment

Figure 5A:
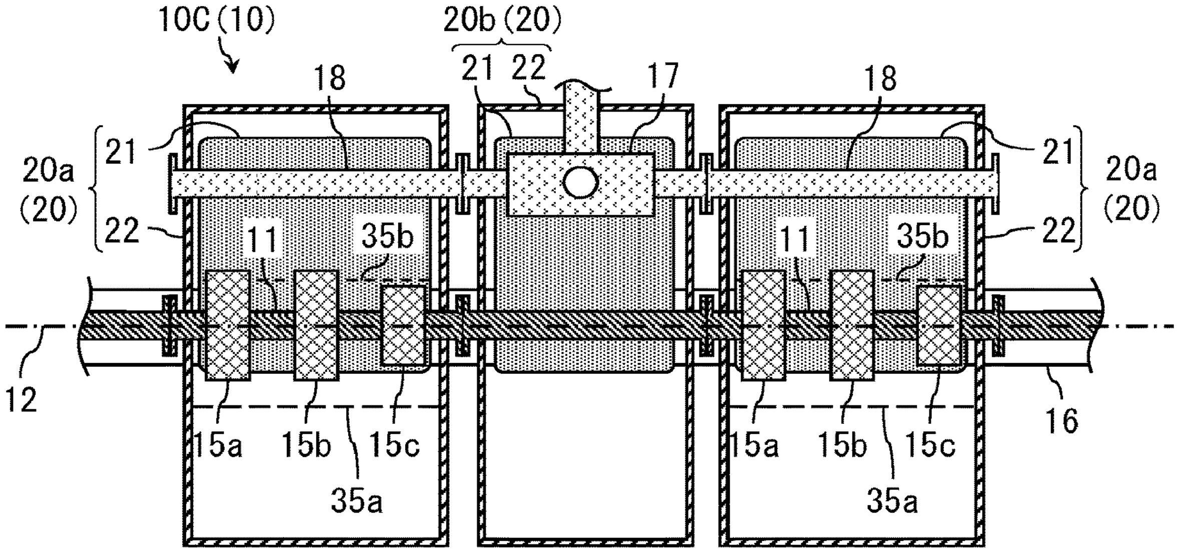
FIG. 5A to FIG. 5C are top views of the charged particle accelerator device according to the third embodiment.
Figure 5B:
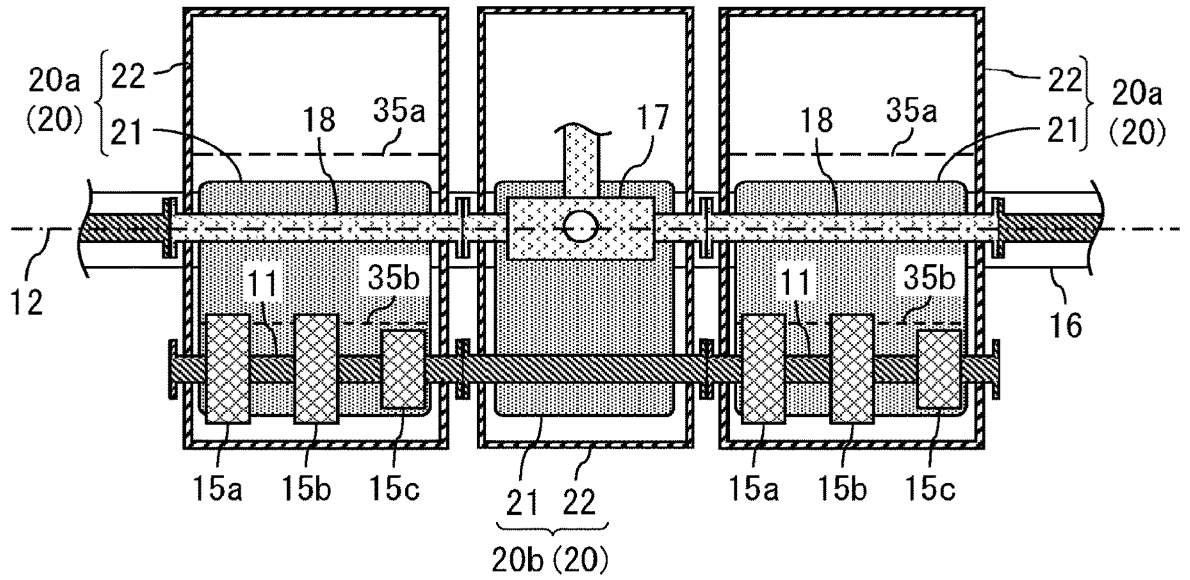
Figure 5C:
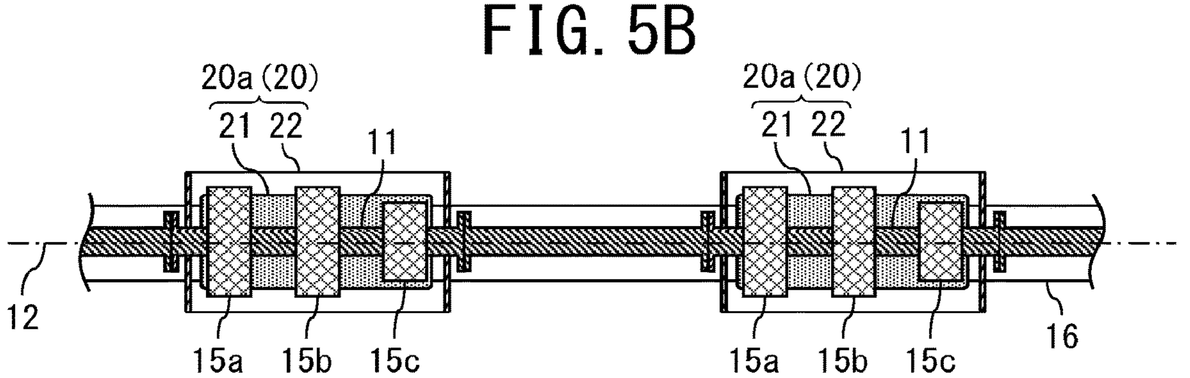

Next, the third embodiment of the present invention will be described by referring to FIG. 5A to FIG. 5C. FIG. 5A to FIG. 5C are top views of the charged particle accelerator device 10C according to the third embodiment, FIG. 5A is a top view at the time of installation, FIG. 5B shows the adjustment stage, and FIG. 5C shows the normal state. In FIG. 5A to FIG. 5C, components having the same configuration or function as those in FIG. 1A to FIG. 1C or FIG. 2A to FIG. 2C are denoted by the same reference signs, and duplicate description is omitted.

In addition to the stage 20*a* where the controllers 15 (15*a*, 15*b*, 15*c*) are installed, the charged particle acceleration device 10C of the third embodiment further includes another stage 20*b* that reversibly moves the adjuster 17 to be operated in the adjustment stage in the direction of intersecting the beam trajectory 12. As a result, in the adjustment stage, the work of alternately replacing the controllers 15 and the adjuster 17 for positioning the controllers 15 with respect to the beam trajectory 12 can be performed without realignment adjustment. Further, the stage 20*b* on which the adjuster 17 is installed can be removed as shown in FIG. 5C after the adjustment stage is completed.

As shown in FIG. 5C, in the charged particle acceleration device 10 (10A, 10B, 10C) of each embodiment, each fixing plate 22 and each moving plate 21 can be partially divided except for the area to be occupied by the controllers 15 (15*a*, 15*b*, 15*c*) during normal operation.

Each fixing plate 22 is provided with a pair of dividing boundaries 35*a* at symmetrical positions centered on the beam trajectory 12. Each fixing plate 22 is configured to be trisected into three divisions by the pair of dividing boundaries 35*a*, and the three divisions are integrated at least in the adjustment stage. Similarly, each moving plate 21 is provided with a pair of dividing boundaries 35*b* at symmetrical positions centered on the beam trajectory 12. Each moving plate 21 is configured to be trisected into three divisions by the pair of dividing boundaries 35*b*, and the three divisions are integrated at least in the adjustment stage. Since those components are configured as described above, after the adjustment stage is completed, unnecessary areas of the fixing plates 22 and the moving plates 21 can be removed, and the surrounding space of the charged particle acceleration device 10 can be secured.

Figure 6:
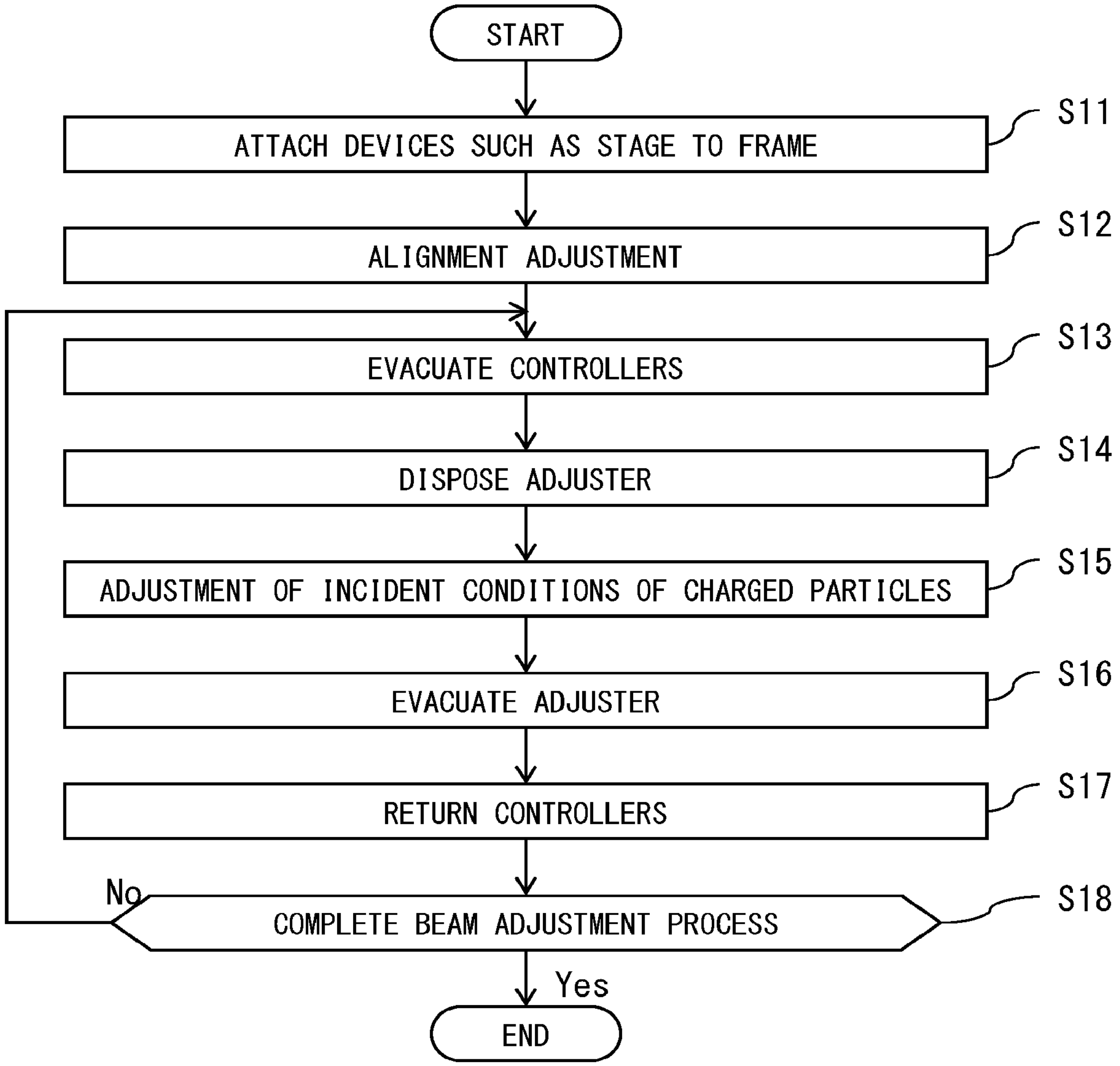
FIG. 6 is a flowchart of a method of adjusting the charged particle acceleration device according to each embodiment.

An adjustment method of the charged particle acceleration device according to each embodiment will be described on the basis of the flowchart of FIG. 6 by referring to FIG. 1A to FIG. 2C as required.

First, in the step S11, as shown in FIG. 1A to FIG. 1C, the integrated structure including the duct 11, the controllers 15 (15*a*, 15*b*, 15*c*) and the stage 20 is attached to the frame 16.

In the step S12, alignment adjustment for the beam trajectory 12 is performed.

Next, the beam adjustment process is started.

In the step S13, the stage 20 is moved such that the controllers 15 are evacuated from the beam trajectory 12 as shown in FIG. 2A to FIG. 2C.

In the step S14, the adjuster 17 is disposed at the beam trajectory 12.

After making such a state, in the step S15, charged particles are emitted from an injector (not shown) and incident conditions of the charged particles are adjusted.

After the adjustment of the incident conditions of the charged particles is completed, the adjuster 17 is evacuated from the beam trajectory 12 in the step S16, and the stage 20 is moved to return the controllers 15 to the beam trajectory 12 in the step S17. The steps S13 to S17 are repeated until the beam adjustment process is completed (step S18 No Yes, END).

According to the charged particle acceleration device of at least one embodiment described above, the stage for reversibly moving the controller(s) in the direction intersecting the beam trajectory is provided, which eliminates the need for repeating the alignment adjustment even in the case of repeating installation of the controller(s).

While certain embodiments have been described, these embodiments have been presented by way of example only, and are not intended to limit the scope of the inventions. These embodiments may be embodied in a variety of other forms, and various omissions, substitutions, and changes may be made without departing from the spirit of the inventions. These embodiments and their modifications are included in the accompanying claims and their equivalents as well as included in the scope and gist of the inventions.

The invention claimed is:

1. A charged particle acceleration device comprising:
- a controller configured to control a beam trajectory of charged particles that pass through a duct, the duct being inserted through the controller; and
- a stage that is supported by a frame fixed to a base and reversibly moves the controller in a direction of intersecting the beam trajectory, wherein
- the stage includes:
  - a fixing plate to be fixed to the frame,
  - a moving plate to which the controller is fixed, the moving plate being configured to move relative to the fixing plate, and
  - a regulator configured to regulate movement of the moving plate with respect to the fixing plate.

2. The charged particle acceleration device according to claim 1, wherein the stage further includes a linear-motion driver that axially rotates to move the moving plate with respect to the fixing plate.

3. The charged particle acceleration device according to claim 1, further comprising another stage aside from the stage on which the controller is installed,
- wherein the another stage is configured to reversibly move an adjuster to be operated during an adjustment stage in a direction of intersecting the beam trajectory.

4. The charged particle acceleration device according to claim 1, wherein at least one of the fixing plate and the moving plate are partially dividable except for an area to be occupied by the controller during normal operation.

5. A method for adjusting a charged particle acceleration device that includes:
- a controller configured to control a beam trajectory of charged particles that pass through a duct, the duct being inserted through the controller, and
- a stage that is supported by a frame fixed to a base and reversibly moves the controller in a direction of intersecting the beam trajectory, the method comprising:
- attaching an integrated structure including the duct, the controller, and the stage to the frame and then performing alignment adjustment with respect to the beam trajectory;
- moving the stage in such a manner that the controller is evacuated from the beam trajectory;
- disposing an adjuster on the beam trajectory and then adjusting incident conditions of the charged particles;
- evacuating the adjuster from the beam trajectory; and
- moving the stage in such a manner that the controller is returned to the beam trajectory.

* * * * *